Jan. 23, 1962

R. R. WARNECKE 3,018,448

TRAVELLING WAVE AMPLIFIER

Filed March 24, 1959

INVENTOR
R. R. WARNECKE
BY Craig and Freudenberg
ATTORNEYS

United States Patent Office 3,018,448
Patented Jan. 23, 1962

3,018,448
TRAVELLING WAVE AMPLIFIER

Robert R. Warnecke, Paris, France, assignor to Compagnie Generale de Telegraphie Sans Fil, Paris, France Filed Mar. 24, 1959, Ser. No. 801,491
Claims priority, application France Apr. 30, 1958
6 Claims. (Cl. 330—43)

Figures 1, 3:
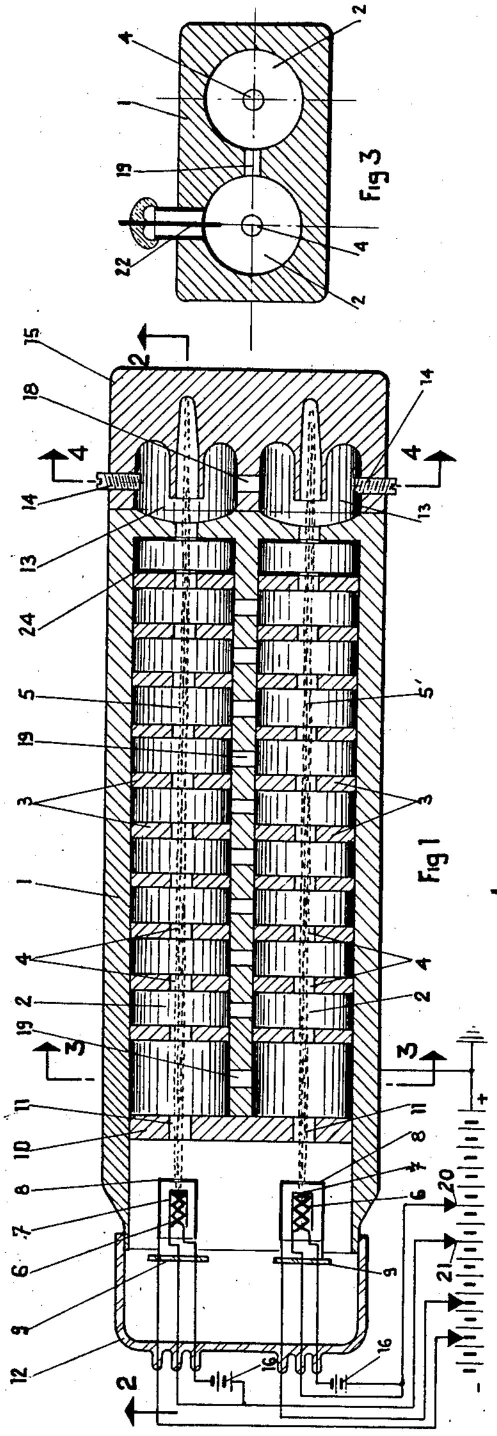

This invention relates to travelling wave tubes and more particularly to travelling wave amplifiers having high power output and increased band width and wherein the energy is abstracted from a cavity resonator in which it is induced by an electron beam.

It is known in the art to use travelling wave amplifiers in which the bunching of the electrons is produced by interaction of a beam with a delay circuit supplied with microwave energy whereas the output energy is furnished by a cavity resonator coupled with the beam at the extremity of its path. Such a known device is illustrated in U.S. Patent 2,580,007, O. Doehler et al., issued December 25, 1951, assigned to same assignee as the present application. Such amplifiers, especially the high-power ones, are characterized by a relatively high gain and relatively narrow band width.

An object of the invention which relates to this type of amplifiers and more particularly to the high power ones, is to widen the band.

Another object of this invention is to provide improved travelling wave tube structure which is a composite of a plurality of travelling wave systems intercoupled at points along their length to provide high gain over a wider band width.

Another object of this invention is to provide an improved travelling wave amplifier using different electrical parameters in systems of similar configuration wherein the respective systems may effectively operate with different gain at different frequencies whereby a change in frequency in the amplifier can be achieved with a minimum change in output energy.

Still another object of the present invention is to provide an improved unitary structure for achieving the aforegoing objects and for simplifying the intercoupling of energy between multiple travelling wave systems.

Another object of this invention is to obtain high gain and wide band characteristics in travelling wave tube apparatus in which the output energy is taken from one or more resonant cavities.

A still further object of this invention is to provide an improved high gain wide band travelling wave amplifier utilizing a plurality of travelling wave systems each having a geometrically periodic delay circuit coupled with a respective electron beam and with a cavity resonator for receiving energy from said beam but being in uncoupled relationship with the respective delay circuit.

According to the invention, several parallel coextensive systems each one comprising an electron gun, a delay circuit and at least one output cavity, are located in a side-by-side relation and lateral periodic coupling means are provided between the delay circuits as well as mutual coupling between the output cavities, whereas, the electron beams originating in the guns are imparted different velocities, as by the application of different voltages to beam controlling electrodes, whereby high gain can be obtained in the apparatus over a wide band of frequencies.

Figures 2, 4:
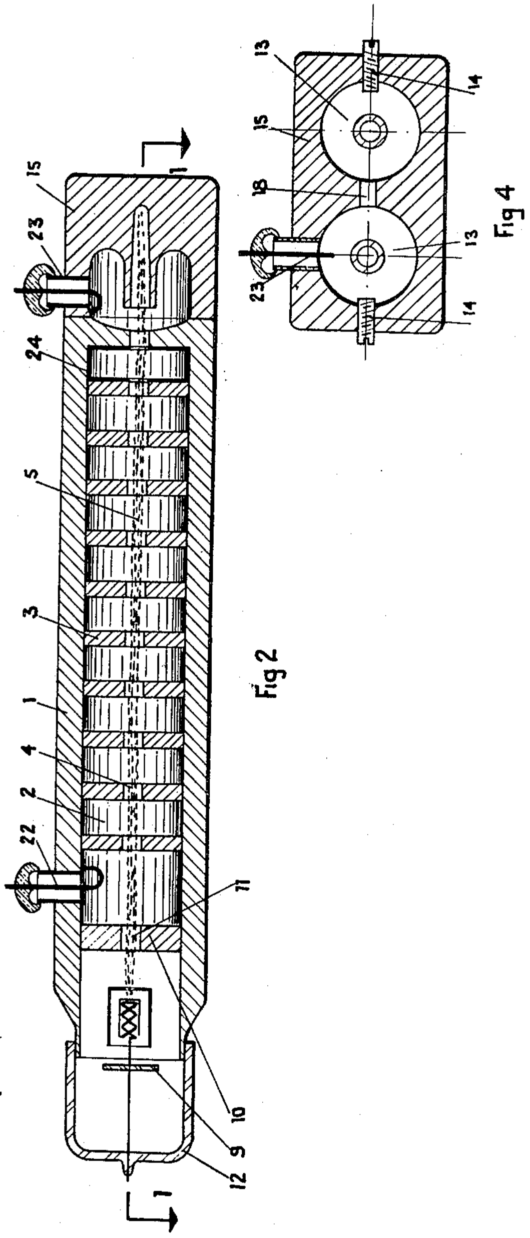

These and other objects, features and advantages of the present invention will become more obvious from the following description when taken in connection with the accompanying drawing which shows, for purposes of illustration only, one embodiment in accordance with the present invention, and wherein:

FIGURE 1 is a longitudinal section of a tube along line 1—1 of FIGURE 2,

FIGURE 2 is a longitudinal section of the same tube taken along line 2—2 of FIGURE 1, FIGURE 3 is a transversal section taken along line 3—3 of FIGURE 1, and FIGURE 4 is another transversal section taken along line 4—4 of FIGURE 1.

As it is shown, the tube consists for instance of two similar tube systems placed side by side, each system comprising a delay circuit and an output cavity and it will be easily understood that any different number of systems could be combined in the same tube according to the same principle.

The tube comprises a parallelepipedic evacuated enclosure 1 in which are provided, side by side, two microwave delay circuits comprising circular guides 2 fitted with a plurality of disks 3 presenting holes 4 in their center for the passage of a beam. The disks 3 are supported within the tube-like guide 2 of the delay line body in geometrically periodic spaced relationship therealong, and with their central holes 4 coaxial, to provide periodic loading of the circular wave guides. These guides fitted with disks form a known type of delay circuit which could be replaced by other similar delay circuits of known types. The walls of the last delay line section are coated with any well-known "attenuating" substance as schematically shown in heavy line at 24. Apertures 4 are provided for the passage of beams 5 and 5' of the respective side-by-side systems, the beams being emitted by distinct electron guns, each one comprising a filament 6, a cathode 7 and a Wehnelt electrode 8 mounted on a support 9. An accelerating anode 10 presenting holes 11 for the passage of the beams is interposed between the guns and the guide entrances. The electrode connections of the electron guns pass through an insulating cap 12 which carries the supports 9 and closes the evacuated enclosure in the gun vicinity.

At the outlet ends of the delay circuits each beam enters a cavity 13 equipped with an internally projecting and externally accessible screw 14 used as a tuning means. After passing through the cavities the beams are picked up by collector 15 which may consist of a separate part which also defines part of the cavity 13 and is brazed to an end face of enclosure 1 for ease of construction.

Filaments 6 are fed by voltage sources 16 whereas cathodes 7 and Wehnelt electrodes 8 are adjustably connected to a voltage source 17 and positive pole of which is connected to the mass of the enclosure 1, accelerating anode 10, delay circuits and collector 15.

According to the invention there may be a lateral coupling established between resonator cavities 13 by means of conduit 18 and lateral couplings between the guides 2 by means of equally spaced apertures 19. The coupling apertures 19 extend between laterally adjacent cavities of the delay lines and are spaced periodically along the lines, there being an aperture at each cavity between adjacent disks 3 and a further aperture 19 between the first disks 3 and the accelerator anodes 10. Electron gun cathodes 7 are connected to distinct terminals 20 and 21 of source 17 for imparting different velocities to beams 5 and 5'.

An input coupling loop or terminal 22 is located between the inlet of one of the guides and the outer circuit. In the same fashion an output coupling loop connection 23 is inserted into one of the cavities 13 and may be connected to any output circuit.

The illustrated device operates as follows:

The microwave excitation is brought to one of the guides from a suitable external source by means of connection 22, the other guide being excited through coupling apertures 19. The travelling wave propagates along each one of the guides where it inter-acts with beams 5 and 5' according to the usual processes. In the last guide-section the wave is absorbed by attenuation means 24 which operate thus as decoupling means between guides 2 and cavities 13, while the electron beams, modulated in density, enter cavities 13. They induce an ultra-high frequency field in the cavities from which the energy is taken out at 23, the energy produced in the cavity not provided with an output coupling loop connection being transferred to the other cavity through coupling 18.

Cavities 13 are tuned by means of screws 14 either on the frequency of the utilization wave or on adjoining frequencies depending upon the band width requirements.

The band widening effect which is obtained with a tube according to the present invention can be attributed to the fact that in a travelling wave tube in general the power response curve plotted for a constant frequency in dependence of the velocity of the beam has a peak appearing at a predetermined beam velocity, and that this curve displaces itself as a whole as well as its peak, when the frequency is varied.

Consequently, in a tube according to the present invention comprising several systems operating respectively with different beam velocities, when the frequency is being changed within a predetermined band, then the interaction between each respective delay circuit and beam may be increasing in some systems and decreasing in others, so that the power increases in some cavities and decreases in others in such a manner that the combined power collected from the set of cavities becomes perceptibly equalized in said band.

The lateral couplings have such an effect that the cavities on one hand, and the delay circuits on the other hand operate as a single complex circuit having a lower quality factor Q. The whole of these effects results in an appreciable widening of the band as compared to the tubes, known in the art, of the travelling wave type with resonant output cavities.

It is easily understood that, although only systems having one output cavity have been discussed, the invention also applies to the tubes known in the art comprising several cavities in series in the output circuit, each cavity being connected by suitable coupling to the corresponding adjoining cavities.

While I have shown and described one embodiment in accordance with the present invention, it is understood that the same is not limited thereto but is susceptible of many changes and modifications within the spirit of the present invention, and I, therefore, intend to cover all such changes and modifications as encompassed by the scope of the appended claims.

I claim:

1. A travelling wave amplifier comprising a plurality of systems each comprising a delay circuit having an input and an output for ultra-high frequency waves, input signal connection means coupled to said delay circuit input, cathode means for propagating a respective electron beam in coupled relationship with each said delay circuit, at least one cavity resonator located on the path of each said beam, output signal connection means coupled to at least one cavity resonator, and means for uncoupling each said cavity resonator with respect to the output of its respective delay circuit, means defining a unitary enclosure for supporting said systems in side-by-side relation, means for laterally mutually coupling said delay circuits, means for mutually coupling said cavity resonators, and means for imparting respectively different velocities to different respective electron beams.

2. An amplifier as claimed in claim 1, wherein each of said delay circuits is a geometrically periodical structure, said lateral couplings being periodically provided along said structure.

3. An amplifier as claimed in claim 1, wherein each of said delay circuits is a circular wave guide periodically loaded with transverse disk-shaped elements, said elements having in their centers apertures for passing said beam.

4. An amplifier as claimed in claim 3, comprising in the wall of said wave guide and between two successive disk-shaped elements, at least one aperture for laterally coupling said guide with at least one adjacent delay circuit.

5. An amplifier as claimed in claim 3, wherein said uncoupling means are formed by attenuating means coating the last element of said periodically loaded guide adjacent said cavity resonator.

6. A travelling wave amplifier comprising a plurality of systems forming a unitary structure, said systems being arranged side by side and each system comprising a delay circuit for ultra-high frequency wave energy, cathode means for each delay circuit for propagating a respective electron beam in coupled relationship therewith, a cavity resonator located on the path of said beam in coupled relationship therewith at one end of said delay circuit, and means for decoupling said cavity resonator with respect to the adjacent end of its respective delay circuit, said delay circuits being located in side by side relation and including means for laterally mutually coupling said delay circuits to each other at a plurality of points along said delay circuits, means for mutually coupling said cavity resonators to each other, means for imparting a different velocity to each of said electron beams, input signal connection means coupled to each of said delay circuits at the end thereof opposite said cavity resonators, and output signal connection means coupled to one of said cavity resonators.

References Cited in the file of this patent

UNITED STATES PATENTS

| | | |
|---|---|---|
| 2,381,320 | Tawny | Aug. 7, 1945 |
| 2,652,513 | Hollenberg | Sept. 15, 1953 |
| 2,694,159 | Pierce | Nov. 9, 1954 |
| 2,695,973 | Ginzton | Nov. 30, 1954 |
| 2,806,172 | Cuccia | Sept. 10, 1957 |

FOREIGN PATENTS

| | | |
|---|---|---|
| 706,094 | Great Britain | Mar. 24, 1954 |